(12) United States Patent
Krake et al.

(10) Patent No.: US 9,826,845 B2
(45) Date of Patent: Nov. 28, 2017

(54) METHOD AND APPARATUS FOR HANGING AN OBJECT

(71) Applicant: Under the Roof Decorating Inc., Calgary (CA)

(72) Inventors: Kelly R. Krake, Calgary (CA); Liette Tousignant, Calgary (CA); Michael Kurtz, Calgary (CA)

(73) Assignee: UNDER THE ROOF DECORATING INC., Calgary (CA)

( * ) Notice: Subject to any disclaimer, the term of this patent is extended or adjusted under 35 U.S.C. 154(b) by 45 days.

(21) Appl. No.: 14/960,980

(22) Filed: Dec. 7, 2015

(65) Prior Publication Data

US 2017/0055732 A1   Mar. 2, 2017

Related U.S. Application Data

(63) Continuation-in-part of application No. 14/842,128, filed on Sep. 1, 2015, and a continuation-in-part of application No. 14/842,024, filed on Sep. 1, 2015.

(51) Int. Cl.
*A47G 1/06* (2006.01)
*A47G 1/20* (2006.01)
(Continued)

(52) U.S. Cl.
CPC ............ *A47G 1/205* (2013.01); *A47G 1/06* (2013.01); *A47G 1/1606* (2013.01);
(Continued)

(58) Field of Classification Search
CPC ...... A47G 1/205; A47G 1/1633; A47G 1/164; A47G 1/162; A47G 1/1626
(Continued)

(56) References Cited

U.S. PATENT DOCUMENTS 1,159,813 A   11/1915   Volkhardt
1,340,711 A * 5/1920   Greenwald .............. A47G 1/22
                                               248/489
(Continued)

FOREIGN PATENT DOCUMENTS

FR   2835167   8/2003
GB   1031208   6/1966
(Continued)

*Primary Examiner* — Kristina N Junge
(74) *Attorney, Agent, or Firm* — Norton Rose Fulbright Canada LLP; Alexandre Daoust (57) ABSTRACT

An apparatus and method for hanging objects on a supporting wall includes a bracket with an outwardly extending shelf for supporting engagement with the object. A flange extends upwardly from the bracket and is secured by a fastener to the object. A marking device is removably mounted in an aperture formed in the bracket and has a sharp marking element extending therefrom. After the bracket is attached to the object by the fasteners and the marking element is positioned in the aperture, the object is pressed against the supporting wall at the desired hanging location whereupon the marking element marks the wall at the correct location for installing the hanging hardware. After the hanging hardware is installed at the marked locations, it is subsequently received in the bracket aperture after the marking element is removed therefrom to hang the object on the hanging hardware.

19 Claims, 11 Drawing Sheets

(51) Int. Cl.
*F16M 13/02* (2006.01)
*A47G 1/16* (2006.01)

(52) U.S. Cl.
CPC ........... *A47G 1/1633* (2013.01); *F16M 13/02* (2013.01); *A47G 1/16* (2013.01); *A47G 1/162* (2013.01)

(58) Field of Classification Search
USPC ........................... 40/713; 248/497, 495, 496
See application file for complete search history.

(56) References Cited

U.S. PATENT DOCUMENTS

| | | | |
|---|---|---|---|
| 1,407,177 A | 2/1922 | Stone | |
| 1,496,282 A | 6/1924 | Taylor | |
| 1,633,859 A | 6/1927 | Harvey | |
| 2,010,660 A | 8/1935 | Ferris | |
| 2,204,862 A | 6/1940 | Lehman | |
| 2,639,109 A * | 5/1953 | Hoag | A47G 1/162 248/497 |
| 3,265,339 A * | 8/1966 | Hushek | A47G 1/162 248/495 |
| 3,514,886 A | 6/1970 | Drakard | |
| 3,529,799 A | 9/1970 | Schaefer | |
| 3,692,265 A | 9/1972 | Barriger | |
| 3,787,934 A | 1/1974 | Gross | |
| 3,861,639 A | 1/1975 | Morrill | |
| 4,040,149 A | 8/1977 | Einhorn | |
| 4,179,089 A | 12/1979 | Parr, Jr. | |
| 4,348,826 A | 9/1982 | Reim | |
| 4,437,639 A * | 3/1984 | Stein | F16M 13/02 248/489 |
| 4,458,873 A | 7/1984 | Sutherland | |
| 4,606,526 A | 8/1986 | Rabinowitz | |
| 4,689,906 A * | 9/1987 | Sherman | A47G 1/1666 248/495 |
| 4,809,859 A | 3/1989 | Chung | |
| D303,942 S | 10/1989 | Bottcher | |
| 5,189,820 A | 3/1993 | Komamura | |
| 5,199,681 A | 4/1993 | Reidy | |
| 5,249,765 A | 10/1993 | Garcia | |
| 5,255,458 A | 10/1993 | Piel | |
| 5,265,358 A | 11/1993 | Borod | |
| 5,279,056 A | 1/1994 | Komamura | |
| 5,303,895 A | 4/1994 | Hart | |
| 5,464,185 A | 11/1995 | Hensley | |
| 5,799,429 A | 9/1998 | Speshyock | |
| 5,947,437 A | 9/1999 | Tate et al. | |
| 6,042,078 A | 3/2000 | Donovan | |
| 6,439,520 B1 | 8/2002 | Johnson | |
| 6,682,033 B1 | 1/2004 | Cohen et al. | |
| 6,719,260 B1 | 4/2004 | Hart | |
| 6,729,060 B1 | 5/2004 | Rietkerk | |
| 7,313,880 B2 | 1/2008 | Yamagishi | |
| D572,122 S | 7/2008 | Cave | |
| 8,104,208 B2 | 1/2012 | Schymura | |
| 8,342,472 B2 * | 1/2013 | Gaudron | A47G 1/18 248/475.1 |
| 8,632,044 B2 | 1/2014 | Cave | |
| 8,740,171 B2 | 6/2014 | Crescenzo | |
| 8,793,910 B2 | 8/2014 | Froio et al. | |
| 8,898,945 B2 * | 12/2014 | Miller | A47G 1/162 40/713 |
| RE45,475 E | 4/2015 | Schymura | |
| 9,259,105 B2 | 2/2016 | Van Bortel | |
| D753,465 S | 4/2016 | Marsh | |
| 2005/0006552 A1 | 1/2005 | Giles | |
| 2007/0210234 A1* | 9/2007 | Lin | A47G 1/162 248/475.1 |
| 2009/0064555 A1 | 3/2009 | Schymura | |
| 2009/0113776 A1 | 5/2009 | Van Bortel | |
| 2009/0193674 A1* | 8/2009 | Megahed | A47G 1/205 33/666 |
| 2009/0294610 A1* | 12/2009 | Paharik | A47G 1/1606 248/220.21 |
| 2012/0036754 A1 | 2/2012 | Van Bortel | |
| 2014/0173923 A1 | 6/2014 | Van Bortel | |
| 2017/0055730 A1 | 3/2017 | Krake et al. | |
| 2017/0059084 A1 | 3/2017 | Krake et al. | |

FOREIGN PATENT DOCUMENTS

| | | |
|---|---|---|
| JP | 3872881 | 1/2007 |
| JP | 2015203780 | 11/2015 |
| KR | 100541232 | 1/2006 |
| KR | 20130035592 | 4/2013 |
| WO | 8504789 | 11/1985 |

* cited by examiner

METHOD AND APPARATUS FOR HANGING AN OBJECT

CROSS REFERENCE TO RELATED APPLICATIONS

This application is a continuation-in-part of U.S. patent application Ser. No. 14/842,128, filed Sep. 1, 2015; the disclosure of which is incorporated herein by reference.

This application is a continuation-in-part of U.S. patent application Ser. No. 14/842,024, filed Sep. 1, 2015; the disclosure of which is incorporated herein by reference.

BACKGROUND OF THE INVENTION

Technical Field

The invention relates to an apparatus for hanging objects such as picture frames, mirrors etc. onto a supporting wall or structure. More particularly, the invention relates to an apparatus and method of use for supporting an object on a wall wherein the apparatus includes a hanger bracket having a removably attached marking device which is used to mark the location on the wall where the hanging hardware is to be installed ensuring accurate placement of the object on the wall.

Background Information

One of the common problems in hanging various types of objects on a supporting structure or wall, such as pictures, clocks, mirrors, and other decorations is the correct placement of the hanging hardware such as nails, screws, D-rings etc. on the wall so that the object is at the correct height and location after it is placed on the newly installed hanging hardware. So often, once the hanging hardware is installed in the wall and the object placed thereon, the object is not at the location desired, resulting in removal and subsequent reattachment of the hanging hardware. This results in frustration and needless damage to the wall.

There have been various devices developed for use in properly positioning the mounting hardware, such as various types of levels, laser devices, measuring devices, etc. which can be relatively expensive for only a single or several uses by the installer, and which once used requires subsequent storage for possible reuse in the future.

Therefore, there is a need for a device or apparatus which enables the exact location of the hanging hardware to be marked on a wall before attaching the hanging hardware to the wall by placing the object against the wall at the desired location, enabling the installer to see exactly where the object will be mounted thereon, after which a mark can be easily made to ensure that when the object is replaced on the wall after securing the retaining hardware in the wall, that the location remains the same as that visually seen when the location of the hanging hardware is marked at the time of installation. Furthermore, the need exists for a bracket which can be securely attached to various types of objects, such as frame members, mirrors, clocks, wall art, etc. in a substantially flush manner to a support structure with less hardware and which is provided with a marking element to accurately mark the location on the wall where the hanging hardware is to be installed prior to mounting the object on the installed hanging hardware.

SUMMARY

In one aspect, the invention may provide an apparatus for mounting an object on a support structure comprising: a bracket including a main body having a shelf extending perpendicularly outwardly from the main body for positioning the bracket on the object and a flange extending at a right angle from the shelf; at least one fastener engageable with the flange for securing the bracket to the object; and a marking device removably mounted on the main body, said marking device having a marking element for marking a mark on the support structure after the marking device has been positioned on the main body and the object pressed against the support structure.

In another aspect, the invention may provide in combination, an object and an apparatus for hanging said object on a support structure wherein: said object has at least one horizontally extending member; said apparatus comprises a bracket which includes a main body having a shelf extending perpendicularly from the main body and engageable with horizontally extending member of the object, and a flange extending upwardly from the shelf and forming a right angle therebetween; at least one fastener attaching the flange to the horizontally extending member of the object for securing the bracket to the object; and a marking device removably mounted on the main body, said marking device having a marking element for marking a mark on the support structure after the marking device has been positioned on the main body and the bracket has been secured to the object, and the object pressed against the support structure.

In another aspect, the invention may provide a method of installing a bracket on an object and hanging the object on a support structure including the steps of: providing a bracket having a main body formed with a shelf extending outwardly from the main body, at least one fastener, and a marking device containing a marking element removably mounted in an aperture formed in the main body; placing the bracket shelf against a complementary shaped surface of the object to be supported by the bracket; securing the bracket to the object by utilizing the fastener; pressing the marking element into the support structure by pressing the object against the support structure at the proposed hanging location of the object making a mark at the location where the hanging hardware is to be installed for securing the object to the support structure; securing the hanging hardware on the support structure at the location derived from the mark made by the marking element; removing the marking device from the aperture of the main body; and suspending the object on the hanging hardware by inserting the hanging hardware into the aperture.

In another aspect, the invention may provide an apparatus for suspending an object on a support structure comprising: a bracket including a main body having a shelf extending perpendicularly outwardly from the main body for generally supporting the object thereon and a flange extending upwardly from the shelf; at least one fastener extending between the flange and object for securing the bracket to the object; and an aperture formed in the main body for receiving hardware secured to the support structure for suspending the object on the support structure.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
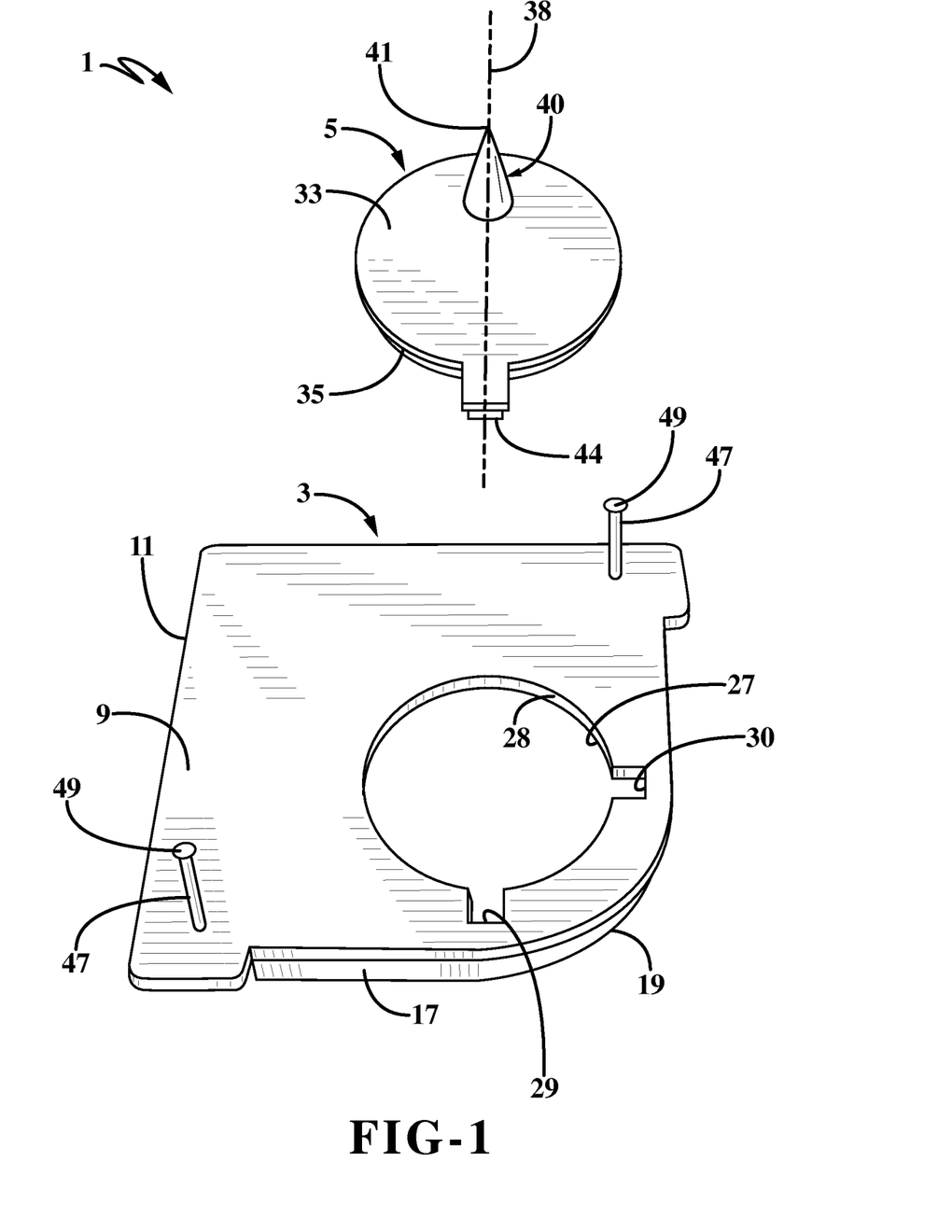
FIG. 1 is a top perspective exploded view of the hanging bracket of the present invention.
Figure 2:
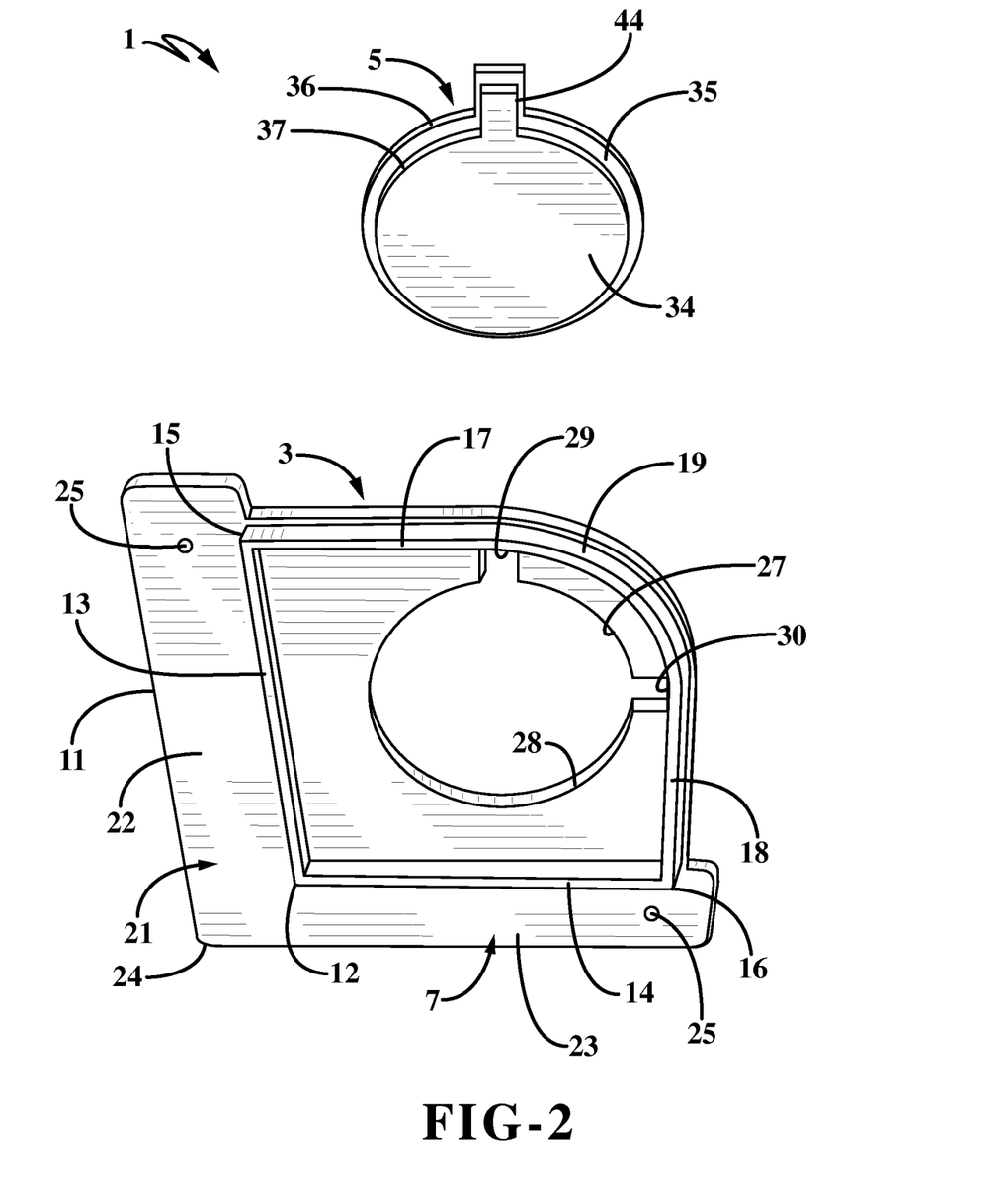
FIG. 2 is a bottom perspective exploded view of the hanging bracket.

The apparatus of the present invention is indicated generally at 1, and is shown particularly in FIGS. 1-2. Apparatus 1 includes two main components, a bracket indicated generally at 3, and a marking device indicated generally at 5. Bracket 3 preferably is a one-piece member formed of a molded plastic material, although it could be multiple pieces without affecting the concept of the invention. Bracket 3 has a generally flat planar configuration which includes first and second opposed surfaces hereinafter referred to as bottom surface 7 and top surface 9 which terminate in an outer peripheral edge 11.

Top surface 9 (FIG. 1) is generally planar throughout its area, whereas bottom surface 7 (FIG. 2) has a pair of legs 13 and 14 which extend perpendicularly outwardly from surface 7 and join at an apex 12 forming a right angle corner therebetween. The terminal ends 15 and 16 of legs 13 and 14 respectively, are connected to a pair of straight sections 17 and 18 which are joined by an arcuate section 19. Sections 17, 18, and 19 extend perpendicularly from bottom surface 7 as do legs 13 and 14 and preferably have the same height as that of legs 13 and 14. Legs 13 and 14 form a V-shaped planar area indicated generally at 21, comprised of two planar legs or sections 22 and 23 between legs 13 and 14 and peripheral edge 11 extending at right angles to each other and meeting at an apex 24. A pair of through holes 25 are formed at the outer ends of planar legs 22 and 23 generally adjacent the junction of leg 13 and straight section 17 and leg 14 and straight section 18 as shown best in FIG. 2.

Figure 5:
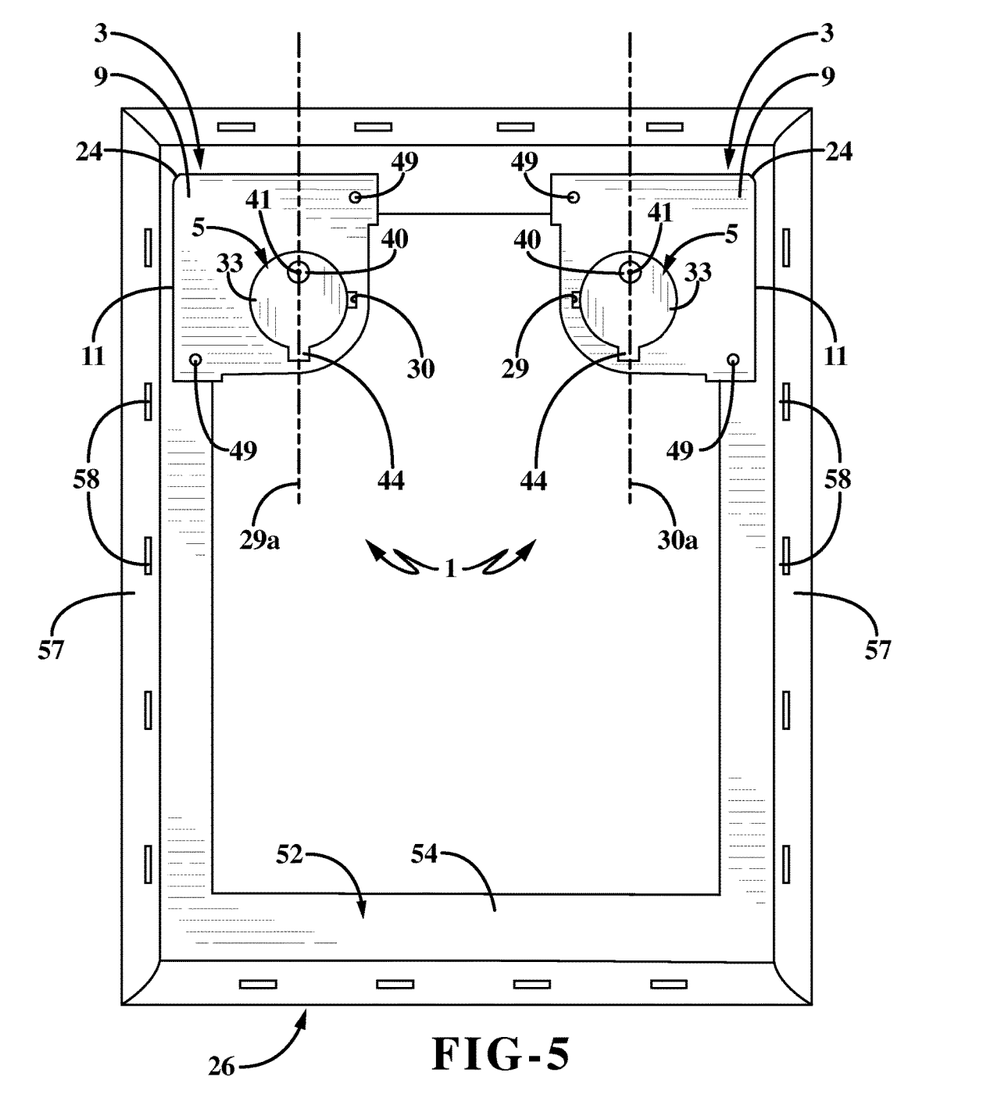
FIG. 5 is a plan view of two of the hanging brackets installed on the back of a picture frame.

Legs 13 and 14 function either as a shelf or positioning leg depending upon which right angled corner of a frame 26 in which they are mounted such as shown in FIG. 5. The particular configuration and shape of bracket 3 and of marking device 5 enables the bracket to be mounted in either the upper right or left angle corner of the frame as discussed below in describing its use in supporting an object such as a rectangular frame 26.

A circular opening or aperture 27 defined by an edge 20 is formed in bracket 3, spaced slightly inwardly from arcuate section 19 and within the raised perimeter formed by legs 13, 14, and sections 17, 18, and 19 on the bottom surface 7. A pair of rectangular-shaped notches 29 and 30 are formed in bracket 3 and extend outwardly from aperture 27 generally adjacent the ends of arcuate section 19.

Marking device 5 preferably has a circular disc-shaped configuration having a pair of opposed top and bottom surfaces 33 and 34 which terminate in a circular stepped edge 35 and includes a marking element 40. Edge 35 has a large outer or top circular edge 36 and a slightly small inner bottom circular edge 37. Marking element 40 extends perpendicularly upwardly from top surface 33 and terminates in a sharp projection or tip 41 and may be cone-shaped as shown in the drawings or have other configurations without effecting the concept of the invention. A locating tab 44 extends outwardly from stepped edge 35 of marking device 5 and has a stepped configuration matching the stepped edge 35 and is located on the opposite end of a diametric line 38 from that of marking element 40. Tab 44 is complementary in shape and size to notches 29 and 30, and functions as a positioning element as described further below. Marking device 31 preferably is formed of a one-piece molded plastic material with marking element 40 and locating tab 44 being formed integrally therewith.

A pair of fasteners 47 which for many applications can be a type of nail or pin having a sharp tip or point 48 and a blunt end 49. Fasteners 47 are adapted to be placed in an received through holes 25 for securing bracket 3 on an object to be supported thereby on a supporting wall 50 as described further below. Nails or pins 47 are just one type of fastener for securing bracket 3 to the back surface of picture frame 26 or other type of object to be supported thereby, although it is readily understood and within the scope of the invention that nails or pins 47 can be other types of fasteners such as tacks, brads, screws, etc. and can even be replaced by an adhesive, a double-sided pressure sensitive adhesive pad, or similar attachment device or fastener for securing bracket 3 on the object to be supported thereby.

The method of installing apparatus 1 on an object such as picture frame 26, is best understood with reference to FIGS. 3 to 10. Frame 26 is formed by four frame members each indicated generally at 52, which usually will have a rectangular cross-sectional configuration having a front surface 53, a rear surface 54, and outer and inner side surfaces 55 and 56, respectfully. Frame members 26 can be formed of many different types of material and will be adaptable for use with apparatus 1. As only one example and shown in the drawings, frame 26 is indented for use with a piece of canvas art 57. Frame members 52 is formed of wood for many pieces of canvas art 57 with the canvas art being stretched over the front surfaces 53, the outer side surfaces 55 and along the rear surfaces 54 and is usually secured to rear surfaces 54 by a plurality of staples 58. However, canvas art 57 can be attached to frame members 52 by an adhesive or other attachment means without affecting the concept of the present invention. Likewise, picture frame 26 could be formed of metal, plastic, or other types of materials for containing a usual piece of artwork therein and need not be canvas art for use of the mounting apparatus of the present invention.

Figure 3:
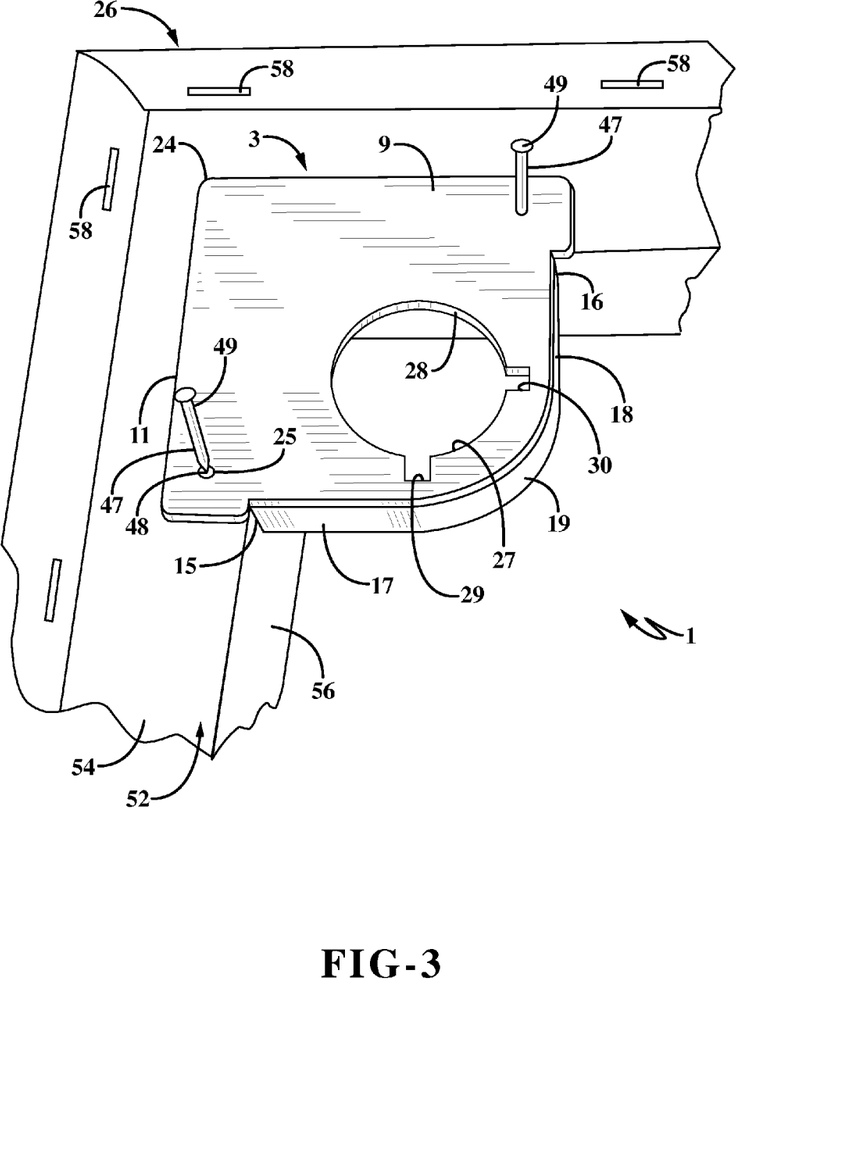
FIG. 3 is a fragmentary diagrammatic view showing the bracket being placed in the corner of a picture frame prior to being secured thereto.

Bracket 3 is installed by laying the bottom surface 7 thereof, and in particular, the V-shaped planar area 21 thereof along and against rear surfaces 54 of the adjacent frame members 52 which form one of the two upper right angled corners as shown in FIG. 3, pressing the V-shaped angle formed by legs 13 and 14 against the inner side surfaces 56 of the frame member. Pressure is then applied downwardly on the V-shaped planar areas 21 followed by the subsequent pressing or driving of fasteners 47 through holes 25 and into rear surfaces 54 of the frame firmly affixing bracket 3 to frame 26. When bracket 3 is installed in the upper left hand corner of the frame as shown in FIG. 3, leg 13 functions as a shelf engaging inner side surface 56 of the horizontal top frame member 52 and generally supporting the frame thereon, with leg 14 functioning as a positioning member for engaging inner side surface 56 of the adjacent frame member. When bracket 3 is installed in the upper right hand corner of the bracket as shown in FIG. 5, leg 14 functions as the support shelf and leg 13 as the positioning member. This enables a single bracket to be used in both of the frame corners avoiding extra hardware.

Figure 4:
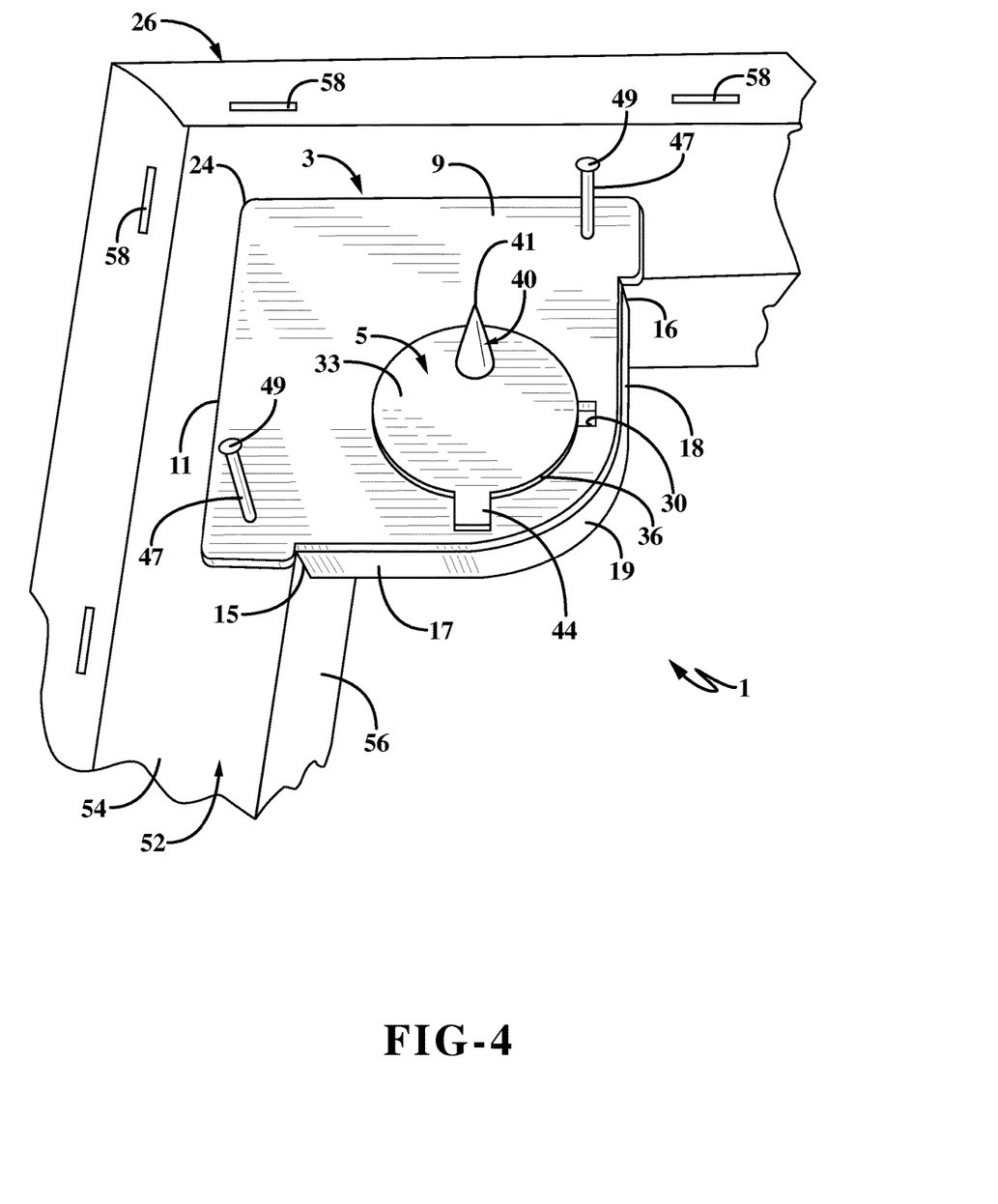
FIG. 4 is a diagrammatic perspective view similar to FIG. 3 showing the marking device being installed in the hanging bracket after it has been attached to a picture frame.

Locating tab 44 is then placed in the appropriate notch 29 or 30 so that marking element 40 is adjacent to and beneath the top frame member. It is readily seen and understood that when bracket 3 is attached in the upper right hand corner of the frame, tab 44 will be placed in notch 30 so that marking element 40 is positioned in alignment with and below leg 14 and the top horizontal frame member. Thus, when bracket 3 is in the upper left hand corner of picture frame 26 as shown in FIGS. 3 and 4, tab 44 will be in notch 29 and when bracket 3 is in the upper right hand corner of picture frame 26, tab 44 will be in notch 30 so that marking element 40 is closely adjacent to and below top frame member 52. The placement of two notches 29 and 30 in alignment with legs 13 and 14, as shown by dot-dash lines 29a and 30a in FIG. 5, enables bracket 3 to be used in both the right or left hand right angled corners of a picture frame enabling only the positioning of tab 44 in the correct notch 29 or 30, thus properly aligning marking element 40 in aperture 27.

It is readily understood that the diameter of circular edge 36 of marking device 5 is slightly larger than the diameter of aperture 27 and that the diameter of inner bottom edge 37 is complementary to the diameter of aperture 27 in order to provide a frictional fit therebetween when marking device 5 is placed in aperture 27. This enables marking device 5 to be easily placed in and removed from aperture 27.

Figure 6:
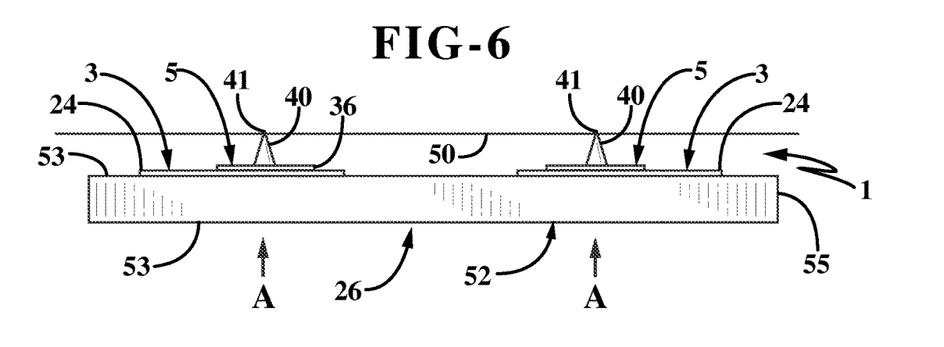
FIG. 6 is a top view of the picture frame of FIG. 5 being placed against a supporting structure prior to marking the location of the hanging hardware.
Figure 7:
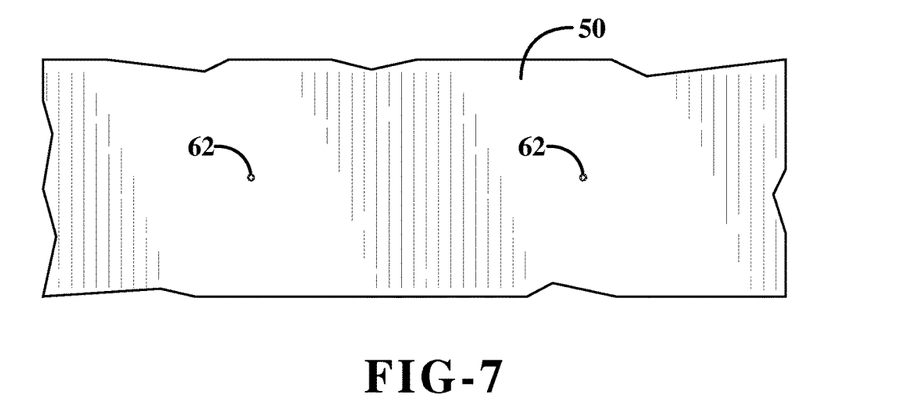
FIG. 7 is a fragmentary view of a section of a supporting structure with the two hanging hardware mounting locations shown thereon.
Figure 8:
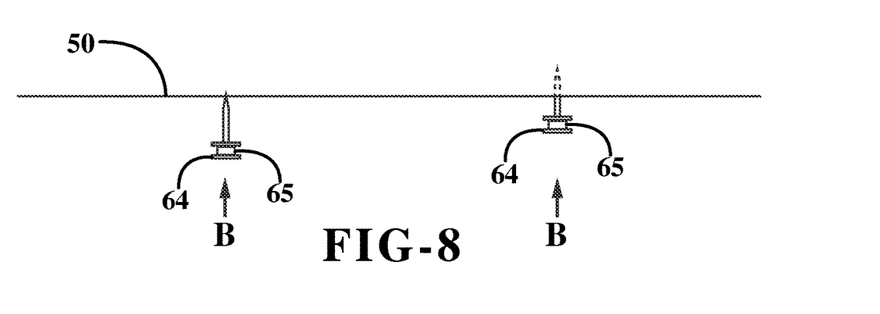
FIG. 8 is a diagrammatic view showing the installation of two deco nails into the supporting structure prior to hanging the picture frame thereon.

After securement of two brackets 3 in the upper right and left hand corners of picture frame 26 as shown in FIG. 5 and the correct positioning of marking elements 40 in apertures 27, the frame is placed adjacent a wall 50 or other support structure at the desired location that the frame is intended to be mounted on the wall. The frame is then pressed firmly against the wall in the direction of Arrows A as shown in FIG. 6. This presses sharp tips 41 of marking elements 40 into the wall forming two marks or indentations 62 as shown in FIG. 7 showing the location where the hanging hardware is to be subsequently installed. Next, two supporting pieces of hanging hardware, which are illustrated for an example as being deco nails 64, are driven into wall 50 as shown by Arrows B (FIG. 8). After installing deco nails 64, the frame is merely suspended therefrom by inserting nails 64 into apertures 27 after removing marking devices 5 from brackets 3. This suspends picture frame 26 on wall 50 on spaced nails 64 or other hanging hardware.

Figure 9:
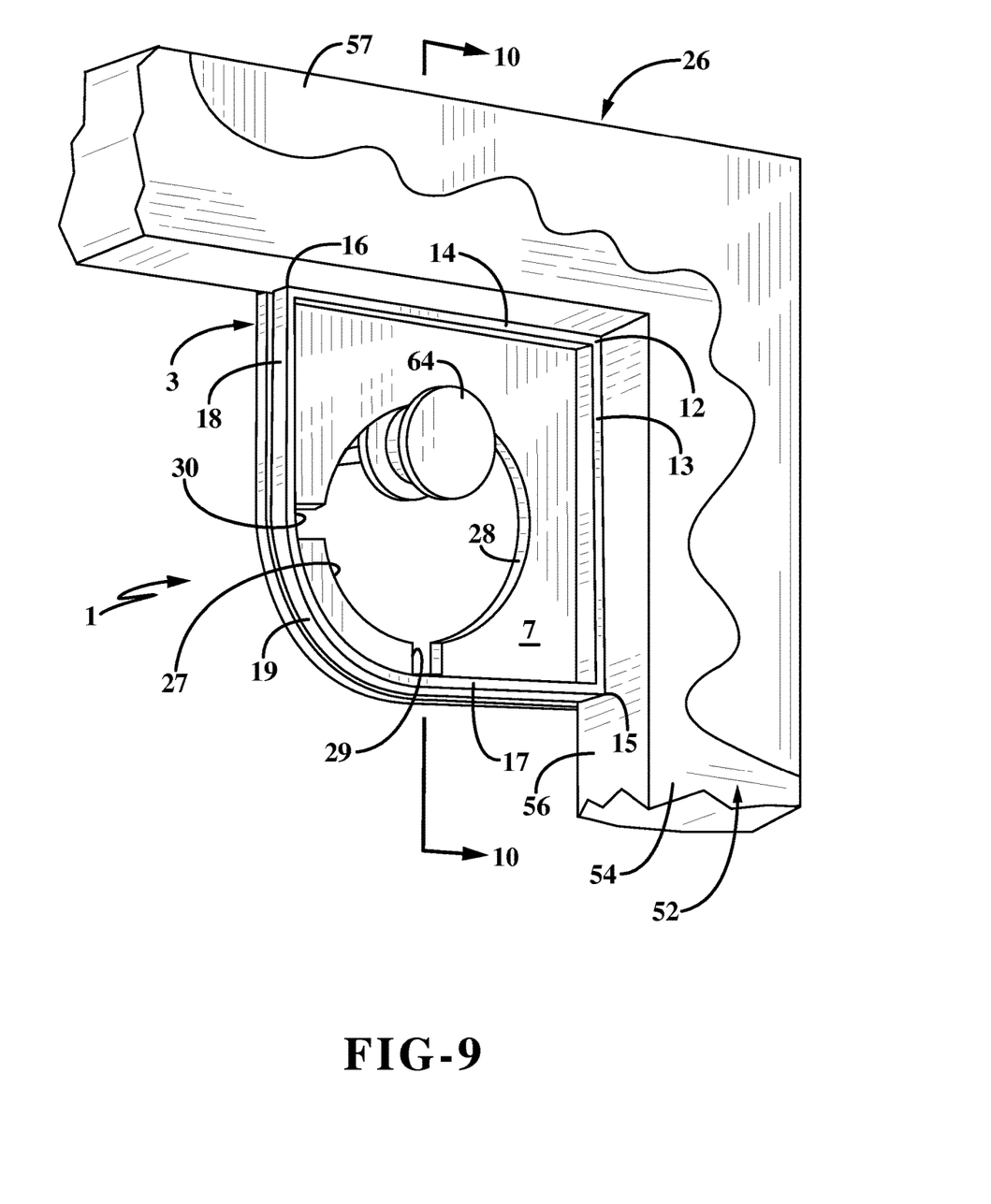
FIG. 9 is a fragmentary front view of a canvas art and frame with portions broken away showing one of the deco nails of FIG. 8 supporting the frame on the support structure.
Figure 10:
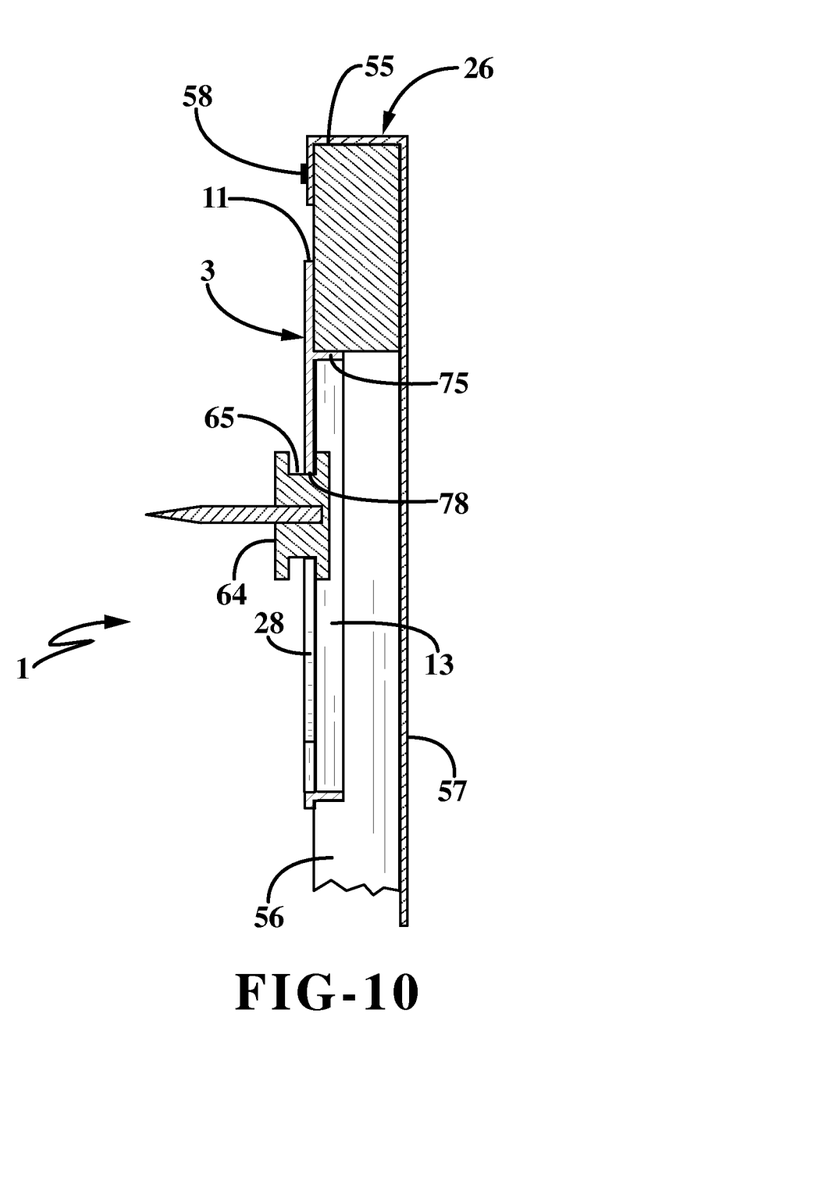
FIG. 10 is a sectional view taken on line 10-10, FIG. 9.
Figure 11:
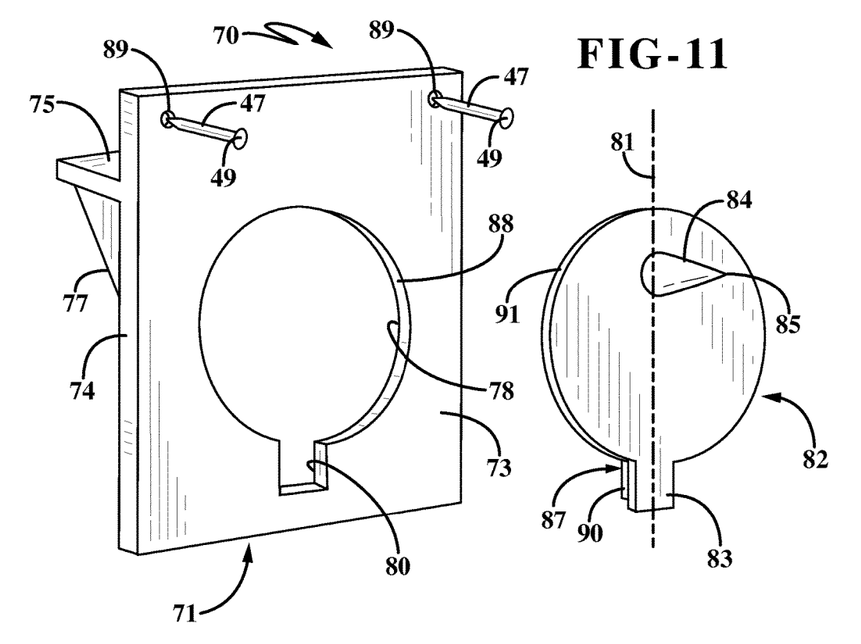
FIG. 11 is a top exploded perspective view of a second embodiment of the hanging bracket of the present invention.
Figure 12:
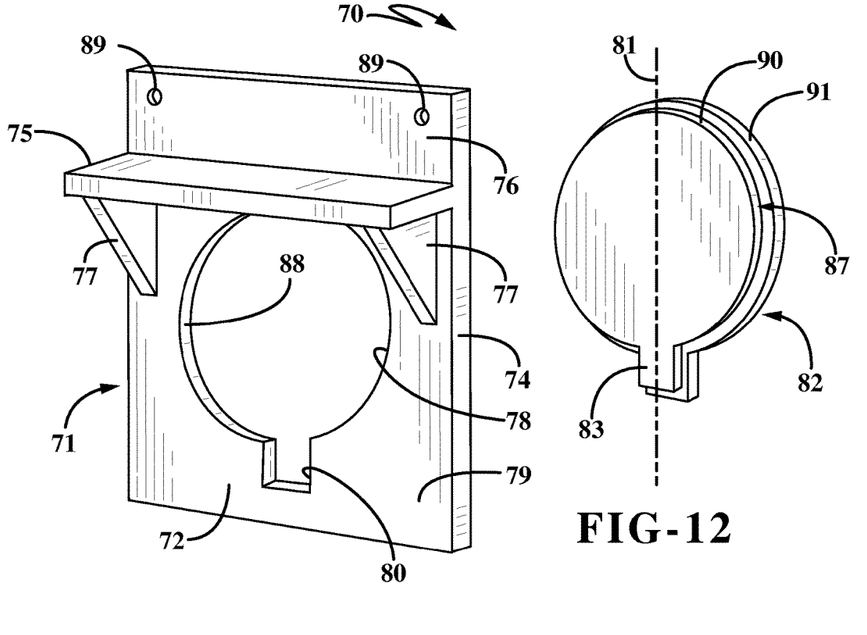
FIG. 12 is a bottom exploded perspective view of the modified hanging bracket of FIG. 11.

When deco nails 64 are used, they will have an annular groove 65 which receives the circular edge 28 of aperture 27. However, deco nails 64 could be replaced by the cylindrical shank of nails, screws, hanging brackets, L-shaped hooks, or other types of well-known picture and art-work hanging hardware within the concept of the present invention. Frame 26 hangs on the wall by locating the heads of the hanging hardware into the large circular openings of apertures 27 in brackets 3, allowing the frame to settle down into the correct position as shown in FIG. 9. The thickness of aperture edge 28 may be such that it complements the width of groove 65 of the deco nail of the attachment hardware which enables the picture frame to hang more securely thereon, and may lock the head of the deco nail into the edge of the frame aperture which will pull the frame into the wall to make it hang parallel with no gaps between the frame and the wall as shown in FIGS. 9 and 10.

Due to the circular configuration of aperture 27, the frame can be bumped and will move slightly, but will realign itself into the same position, which is a feature not found in other types of frame hanging hardware. The size of bracket 3, as well as the type of suspending hardware such as nails, screws, brads, etc. will vary depending upon the size of the object and in particular the artwork frame to be supported thereby. Likewise aperture 27 preferably is circular but could have other configurations for receiving and positioning marking device 5 therein.

A modified form of the apparatus of the present invention is indicated generally at 70, and is shown in particular in FIGS. 11-14. Bracket 70 includes an elongated flat planar member or body 71 having opposed first and second surfaces hereinafter referred tows inner surface 72 and outer surface 73, joined with a rectangular peripheral edge 74. Body 71 includes a leg or shelf 75 which extends perpendicularly outwardly from inner surface 72 and forms a right angle with body 71 and defines an upper end portion or flange 76. A pair of reinforcing ribs 77 may extend between shelf 75 and body 71. A circular aperture 78 is formed in a planar portion 79 of body 71, which aperture is similar to that of aperture 27 of bracket 3 with the exception that it has only a single rectangular-shaped notch 80 formed therein. A disc-shaped marking device 82 similar to that of marking device 5, has a single tab 83 extending outwardly therefrom for replacement within notch 80 when marking device 82 is removably mounted within aperture 78. A marking element 84 similar to marking element 40, is formed integrally on marking device 82 and extends perpendicularly therefrom and terminates in a pointed member or tip 85 similar to tip 41 of marking element 40. Marking element 84 lies on a diameter line 81 which passes through the center of tab 83 and extends outwardly from marking device 82 in an opposite direction from the direction that shelf 75 extends from body 71.

Figure 13:
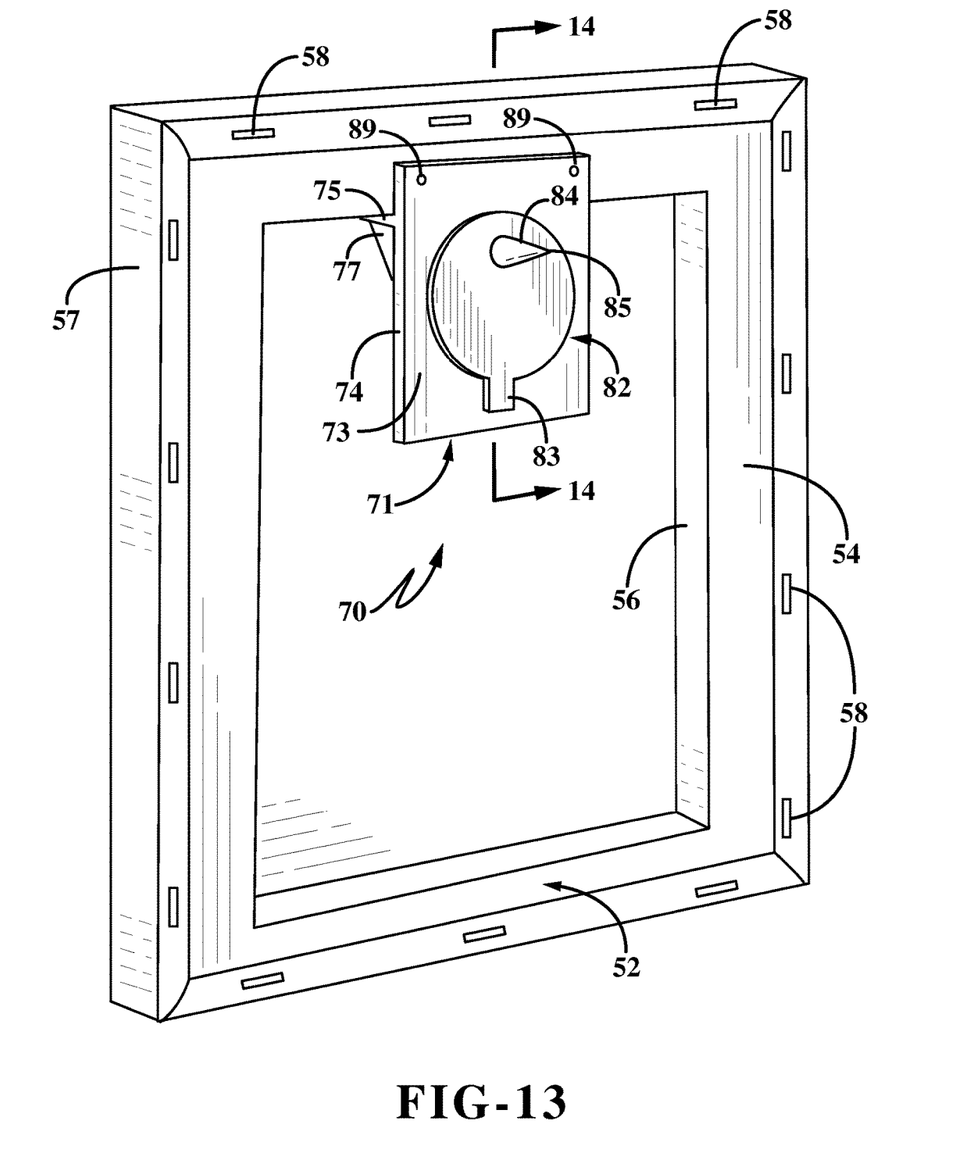
FIG. 13 is a perspective view showing the modified hanging bracket attached to the back of a picture frame with the marking device removably mounted on the bracket.

Bracket 70 is used in a somewhat similar manner as in bracket 3 for supporting an object such as a picture frame or other wall-mounted object, to a wall or supporting structure. Bracket 70 will be secured to the top horizontal frame member 52 spaced inwardly from the corners of the frame as shown in FIG. 13. Shelf 75 engages the inner side surface 56 of top frame member 52, with flange 76 being secured to rear surface 54 by one or more fasteners 47 extending through a pair of spaced holes 89 formed on upper flange 76 of body 71, in a similar manner as are fasteners 47 with bracket 3. Again, fasteners 47 can be various types of nails, screws, brads, or other mounting hardware.

However, as shown in FIG. 13, either one or more brackets 70 will engage inner side surface 56 which is the bottom surface of the upper horizontal frame member 52, for supporting the frame on wall 50. Marking device 82 is used in the same manner as marking device 5 discussed above.

Figure 14:
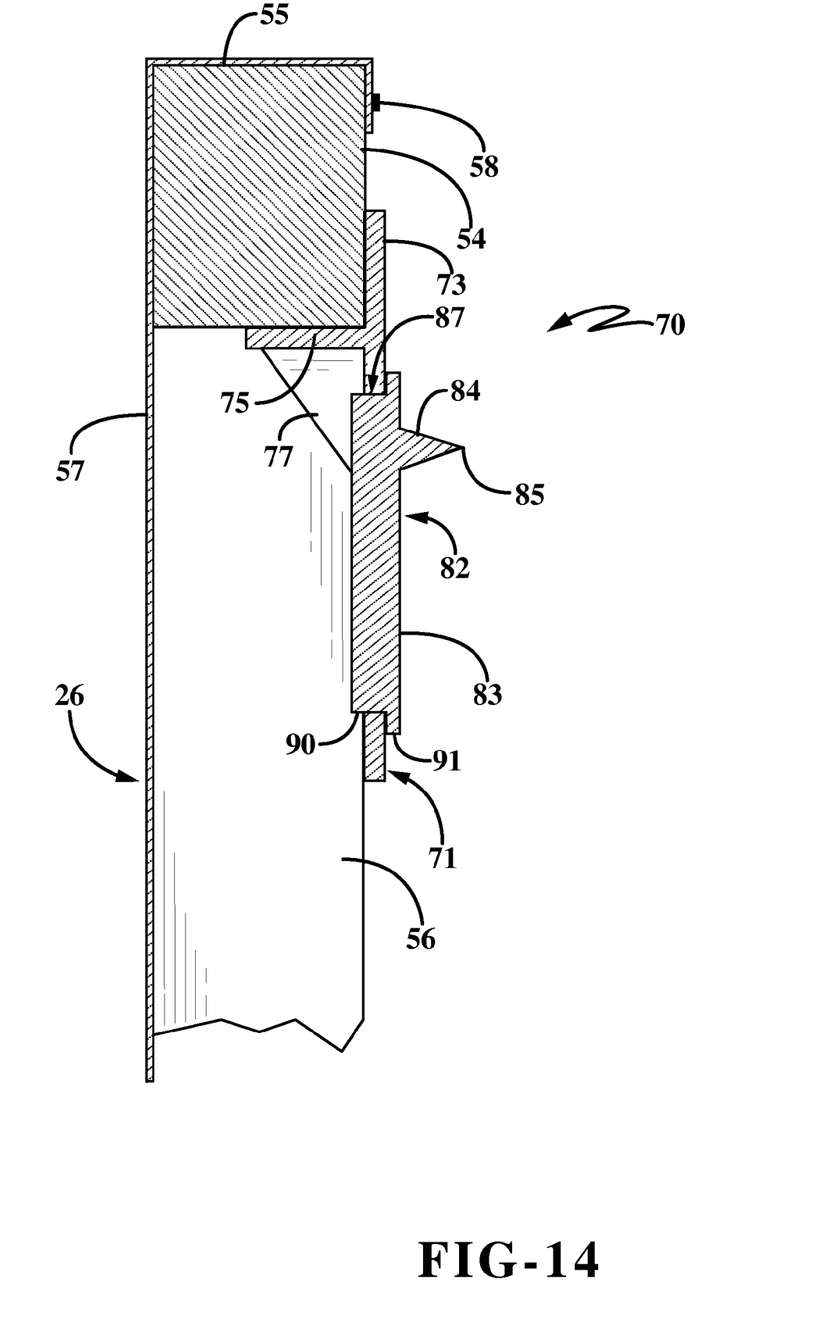
FIG. 14 is an enlarged sectional view taken on line 14-14, FIG. 13.

Tab 83 is placed in notch 80 with a smaller circular edge 90 of a stepped circular undercut edge 87 similar to stepped edge 35 of marking device 5, frictionally engaging a circular edge 88 which defines aperture 78, removably mounting marking device 82 in aperture 78 as shown in FIGS. 13 and 14. Again, the outer diameter or edge 91 of stepped edge 87 will be slightly larger than the diameter of aperture 78. Marking element 84 makes a mark in the wall similar to marks 62 discussed above, for subsequent receiving the hanging hardware.

Again, after making the appropriate mark in wall 50 by pressing inwardly on the frame causing marking element 84 to make a slight indentation in the wall, the hanging hardware is then installed and then subsequently engaged in aperture 78 after removal of marking element 82 from body 71. Thus, after one or more brackets 70 are installed on the top frame member or other portions of another type of object, marking element 84 will make a mark or indentation 62 in the wall indicating the area for placement of the hanging hardware. Again, the engagement of tab 83 in notch 80 properly positions the location of marking element 84 for subsequent making of the indentation in the wall after which the hanging hardware is attached at this location.

Again, tab 83 is removed from within aperture 78 after making the mark on the wall for subsequently receiving a type of hanging hardware through aperture 78 as discussed above for bracket 3.

Bracket 70 preferably will be a one-piece molded plastic member as is marking device 82 and can be manufactured in various sizes depending upon the amount of weight of the object to be supported thereby. Shelf 75 and flange 76 form an L-shaped configuration similar to that formed by legs 13 and 14, with planar portions 22 or 23 of bracket 3. Brackets 3 and 70 are able to be attached to a picture frame or other object by the use of various types of fasteners, after which the object is placed at the desired position on the wall and the location of the hanging hardware easily marked by pressing inwardly on the object at the bracket locations, after which the hanging hardware is installed in the marked indentations, and upon subsequent removal of the marking device from the bracket, the aperture in which the marking disc was located is used to receive the hanging hardware therein. The hanging hardware for bracket 70 is shown as a deco nail 64 in FIGS. 13 and 14 but again can be various other types of hanging hardware. Again, the circular configuration of the aperture enables the hung object to be easily centered thereon and is able to withstand bumping or slight movement without being dislodged from the hanging hardware and may realign itself automatically due to the curvature of the aperture.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. An apparatus for mounting an object on a support structure comprising:
    a bracket including a body having a shelf extending perpendicularly outwardly from the body for positioning the bracket on the object, a positioning leg extending outwardly from the body and extending at a right angle with the shelf for positioning the bracket in a right angle corner of the object, and a flange extending at a right angle from the shelf;
    at least one fastener engageable with the flange for securing the bracket to the object; and
    a marking device removably mounted on the body, said marking device having a marking element for marking a mark on the support structure after the marking device has been positioned on the body and the object pressed against the support structure.

2. The apparatus as defined in claim 1 wherein the body is formed with an aperture; and in which the marking device is removably secured in the aperture with the marking element extending outwardly from the body in a direction opposite from the direction the shelf extends from the body.

3. The apparatus as defined in claim 2 wherein the aperture is circular; and in which the marking device is a circular disc which is pressed into the aperture to removably mount the marking device on the body.

4. The apparatus as defined in claim 3 wherein the marking device includes a positioning element for positioning the marking element with respect to the body when the marking device is removably mounted on the body.

5. The apparatus as defined in claim 4 wherein the aperture is formed with a notch; and in which the positioning element is a tab formed on the disc which is received in the notch when the marking device is removably mounted on the body.

6. The apparatus as defined in claim 1 wherein the marking element is a sharp projection extending outwardly from the marking device.

7. The apparatus as defined in claim 1 wherein the shelf and positioning leg form a pair of planar sections extending at right angles to each other on the body; and in which a pair of fasteners extend through said planar sections to secure the body in a right angle corner of the object to be supported on the support structure.

8. The apparatus as defined in claim 1 wherein the body is a flat planar member with opposed first and second surfaces; in which the shelf is a flat planar member extending perpendicularly outwardly from the first surface; in which the flange is an end portion of the flat planar member and is formed with a hole; and in which the fastener extends through said hole for securing the bracket to the object.

9. The apparatus as defined in claim 8 wherein an aperture is formed in the flat planar member; in which the marking device is a disc removably mounted in the aperture; and in which the marking element is a pointed member extending outwardly from the disc in an opposite direction from the direction that the shelf extends from the planar member.

10. In combination, an object and an apparatus for hanging said object on a support structure wherein:
    said object is a frame and has at least one horizontally extending member and two side frame members forming at least two right angled corners;
    said apparatus comprises a bracket which includes a body having a shelf extending perpendicularly from the body and engageable with the at least one horizontally extending member of the object, a positioning leg extending perpendicularly from the body and forming a right angle with the shelf and engageable with a respective side frame member to position the bracket in one of the right angle corners, and a flange extending upwardly from the shelf and forming a right angle therebetween;
    at least one fastener attaching the flange to the at least one horizontally extending member of the object for securing the bracket to the object; and a marking device removably mounted on the body, said marking device having a marking element for making a mark on the support structure after the marking device has been positioned on the body and the bracket has been secured to the object, and the object pressed against the support structure.

11. The combination defined in claim 10 wherein the apparatus includes a pair of said brackets, the positioning leg of each bracket being engageable with a respective side frame member to position each of said brackets in one of the right angle corners.

12. The combination defined in claim 10 wherein the body of the bracket includes a flat planar member with the first and second surfaces; in which the shelf is a flat planar member extending perpendicularly outwardly from the first surface; and in which the flange is an end portion of the flat planar member which forms a right angle with the shelf.

13. The combination defined in claim 10 wherein the body of the bracket is formed with an aperture; and in which the marking device is removably secured in the aperture with the marking element extending outwardly from the body in a direction opposite from the direction that the shelf extends from the body.

14. The combination defined in claim 13 wherein the aperture is circular; and in which the marking device is a circular disc which is pressed into the aperture to removably mount the marking device on the body.

15. An apparatus for suspending an object on a support structure comprising:
- a bracket including a body having a shelf extending perpendicularly outwardly from the body for generally supporting the object thereon and a flange extending upwardly from the shelf;
- at least one fastener extending between the flange and object for securing the bracket to the object;
- an aperture formed in the body for receiving hardware secured to the support structure for suspending the object on the support structure; and
- a marking element being removably mounted in the aperture of the body for making a mark on the support structure for positioning the hardware thereon.

16. The apparatus defined in claim 15 wherein the at least one fastener is a nail; and in which said nail extends through a hole formed in the upstanding flange.

17. An apparatus for mounting an object on a support structure comprising:
- a bracket including a body having a shelf extending perpendicularly outwardly from the body for positioning the bracket on the object, a positioning leg extending outwardly from the body and extending at a right angle with the shelf for positioning the bracket in a right angle corner of the object, and a flange extending at a right angle from the shelf; and
- a marking device removably mounted on the body, said marking device having a marking element for making a mark on the support structure after the marking device has been positioned on the body and the object pressed against the support structure.

18. In combination, an object and an apparatus for hanging said object on a support structure wherein:
- said object is a frame and has at least one horizontally extending member and two side frame members forming at least two right angled corners;
- said apparatus comprises a bracket which includes a body having a shelf extending perpendicularly from the body and engageable with the at least one horizontally extending member of the object, a positioning leg extending perpendicularly from the body and forming a right angle with the shelf and engageable with a respective side frame member to position the bracket in one of the right angle corners, and a flange extending upwardly from the shelf and forming a right angle therebetween; and
- a marking device removably mounted on the body, said marking device having a marking element for making a mark on the support structure after the marking device has been positioned on the body and the bracket has been secured to the object, and the object pressed against the support structure.

19. An apparatus for suspending an object on a support structure comprising:
- a bracket including a body having a shelf extending perpendicularly outwardly from the body for generally supporting the object thereon and a flange extending upwardly from the shelf;
- an aperture formed in the body for receiving hardware secured to the support structure for suspending the object on the support structure; and
- a marking element being removably mounted in the aperture of the body for making a mark on the support structure for positioning the hardware thereon.

* * * * *